(12) United States Patent
Tarnow et al.

(10) Patent No.: US 6,634,843 B1
(45) Date of Patent: Oct. 21, 2003

(54) CONNECTOR

(75) Inventors: Alan Tarnow, South Orange, NJ (US); Henry Shavel, Livingston, NJ (US)

(73) Assignee: **FRP* Corporation**, Millburn, NJ (US)

( * ) Notice: Subject to any disclaimer, the term of this patent is extended or adjusted under 35 U.S.C. 154(b) by 23 days.

(21) Appl. No.: 09/876,592

(22) Filed: Jun. 7, 2001

(51) Int. Cl.[7] .............................................. F16B 19/00
(52) U.S. Cl. ...................... 411/508; 411/513; 403/155; 403/282; 403/388; 403/397
(58) Field of Search .................. 403/155, 397, 403/388, 315, 329; 411/508, 913, 513, 514, 15

(56) References Cited

U.S. PATENT DOCUMENTS

| | | | | |
|---|---|---|---|---|
| 1,751,013 A | * | 3/1930 | McMullen | 411/364 |
| 2,438,499 A | * | 3/1948 | Hartman | 411/500 |
| 3,195,393 A | * | 7/1965 | Uozumi | 411/513 |
| 3,756,115 A | * | 9/1973 | Schuplin | 411/508 |
| 3,803,670 A | * | 4/1974 | Johnson | 411/508 |
| 4,318,462 A | | 3/1982 | Weinhaus | 191/30 |
| 4,474,517 A | | 10/1984 | Navoczynski | 411/45 |
| 5,857,819 A | * | 1/1999 | Lary et al. | 411/530 |
| 6,139,100 A | * | 10/2000 | Baskin-Lockman et al. | 411/508 |
| 6,199,917 B1 | * | 3/2001 | Clevenger | 411/514 |
| 6,209,178 B1 | * | 4/2001 | Wiese et al. | 411/508 |

FOREIGN PATENT DOCUMENTS

| | | | | |
|---|---|---|---|---|
| DE | 3908000 A1 | * | 9/1990 | F16B/21/06 |
| JP | 3272308 A1 | * | 12/1991 | F16B/19/00 |

OTHER PUBLICATIONS

Picture of clevis pin.
Machinery's Handbook, 25th Edition, 1996, p. 1574.

* cited by examiner

Primary Examiner—Anthony Knight
Assistant Examiner—Christopher Boswell
(74) Attorney, Agent, or Firm—Lerner, David, Littenberg, Krumholz & Mentlik, LLP

(57) ABSTRACT

A connector includes a head from which there extends a split shank. The split shank forms opposing first and second members having an offset or stepped inner surface. The free end of the shank includes a tapered flange provided with a retaining lip which extends beyond the outer surface of the shank. One or more openings may be provided through the shank for receiving a cotter pin.

35 Claims, 2 Drawing Sheets

CONNECTOR

BACKGROUND OF THE INVENTION

The present invention relates in general to connectors for connecting two members together, and more particularly, to connectors of the split pin type which can accommodate the use of an optional cotter pin.

There is known in the connection art various types of connectors and/or fasteners which can be used for mechanically joining two or more members together. These connectors may be generally classified in the categories of either a permanent connector or a removable connector. For example, permanent connectors include rivets, while removable connectors include a broader class of screws, bolts, clevis pins, split pins and the like. Connectors of the foregoing type have been widely used in various applications, from appliances, automotive, house construction, airplanes, railroads, etc. It can be appreciated that most products that are manufactured from more than one component will often include a connector in one form or another.

A clevis pin is provided with an enlarged head and a cylindrical shank extending therefrom. One or more holes are provided through the shank to receive a cotter pin. A split pin also includes an enlarged head and a cylindrical shank which is split longitudinally to allow the shank to compress as it passes through a restricted opening within the members to be connected. The free end of the shank may include a tapered flange forming a lip which extends outwardly to prevent the split pin from being unintentionally or manually being retracted after passing through the restricted opening in the members.

One particular application for connectors of the foregoing type is the railroad industry. In this regard, it is desirable to provide a guard for the third rail of electric railroads which are supported on insulators relative to the ground. The guards function as a shield to prevent accidental contact by personnel or foreign objects with the third rail, while at the same time, permitting engagement with the third rail by the electrical locomotive. The guards are attached to brackets of insulating material which are attached to the third rail in spaced apart locations. As the guards extend for many miles, they are typically formed in sections which can be releasably attached to the brackets by means of a split or clevis pin. This enables replacement of the guard of a particular section in the event the guard becomes damaged. One such connector application is disclosed in Weinhaus, U.S. Pat. No. 4,318,462.

Notwithstanding the known connectors, such as clevis pins and split pins, there remains a need for improvements in connectors which are easily installed for connecting more than one member together through aligned openings.

SUMMARY OF THE INVENTION

In accordance with one embodiment, the present invention is broadly defined by a connector including a head; and a shank extending from the head including first and second members having a free end, the first and second members separated by a slot extending from the free end towards the head, the first and second members including an opening adapted to receive a cotter pin for removably securing the cotter pin to the shank.

In accordance with another embodiment, the present invention is broadly defined by a connector including a head; a shank extending from the head including first and second members having a free end, the first and second members separated by a slot extending from the free end towards the head, each of the first and second members having an offset bordering the slot.

In accordance with another embodiment, the present invention is broadly defined by a connector including a head; a shank extending from the head including first and second members having a free end, the first and second members separated by a slot extending from the free end towards the head, the first and second members having a stepped portion bordering the slot, an opening formed in the offset of the first and second members adapted to receiving a cotter pin for removably securing the cotter pin to the shank; and a tapered flange circumscribing an outer surface of each of the first and second members adjacent the free end thereof.

BRIEF DESCRIPTION OF THE DRAWINGS

The above description, as well as further objects, features and advantages of the present invention will be more fully understood with reference to the following detailed description of a connector, when taken in conjunction with the accompanying drawings, wherein.

DETAILED DESCRIPTION

In describing the preferred embodiments of the present invention, specific terminology will be resorted to for the sake of clarity. However, the invention is not intended to be limited to the specific terms so selected, and is to be understood that each specific term includes all technical equivalence which operate in a similar manner to accomplish a similar purpose.

Figure 1:
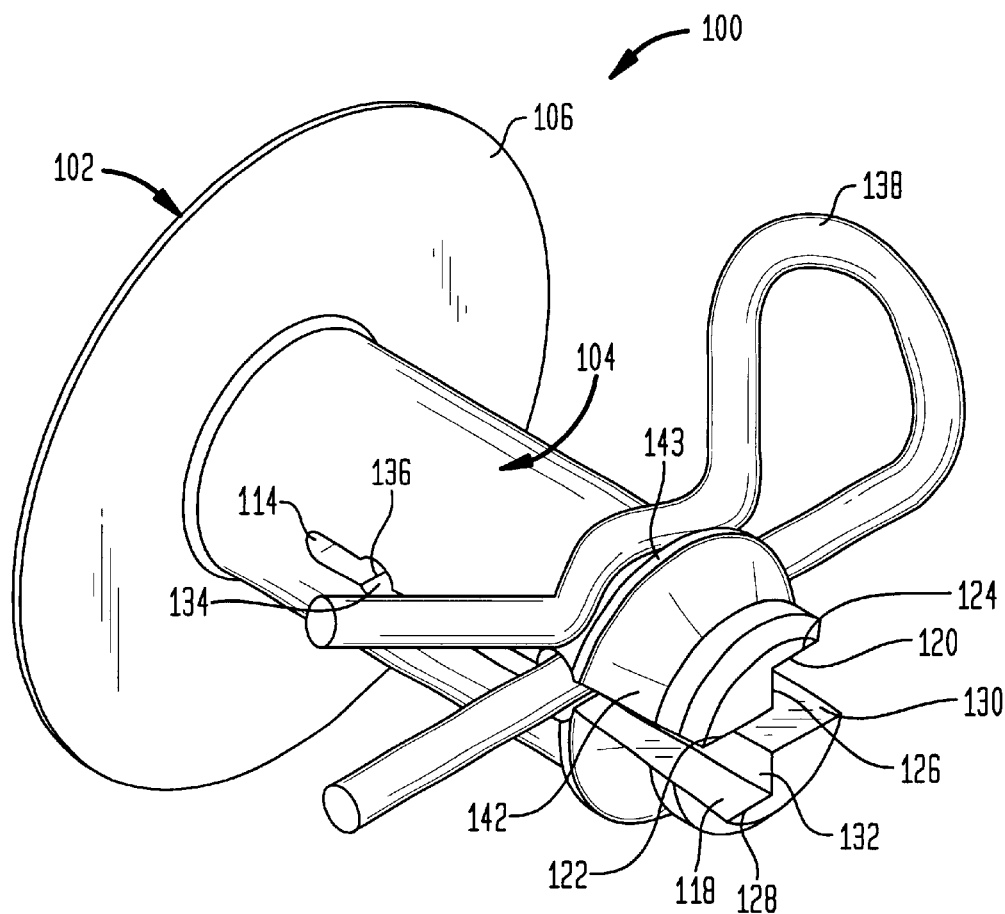
FIG. 1 is a perspective view of a connector constructed in accordance with one embodiment of the present invention to which there is removably attached a cotter pin.
Figure 2:
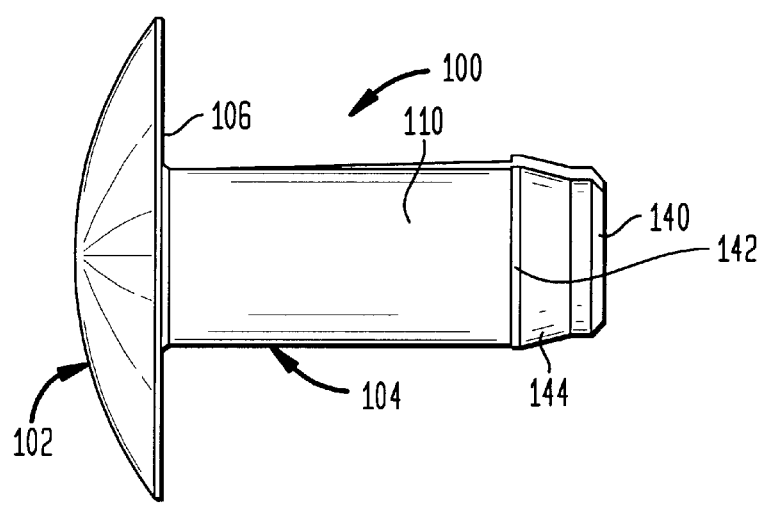
FIG. 2 is a front elevational view of the connector.
Figure 3:
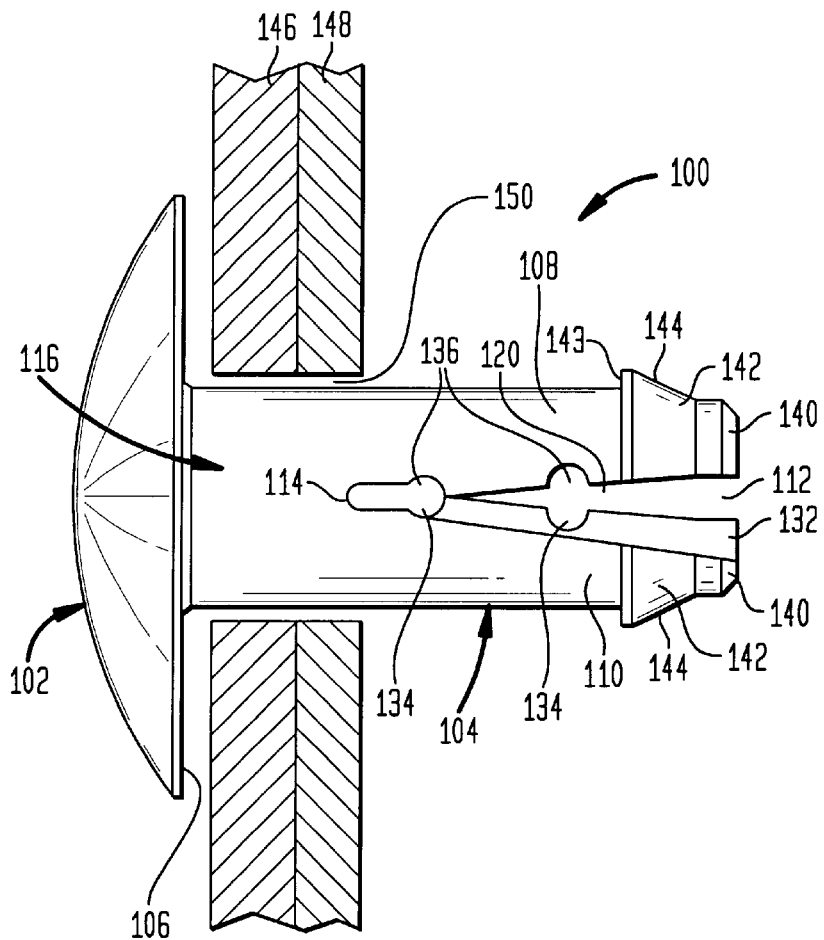
FIG. 3 is a front elevational view of the connector in use in accordance with one embodiment of the present invention.

Referring now to the drawings, wherein like reference numerals represent like elements, there is shown in FIGS. 1–3 a connector constructed in accordance with one embodiment of the present invention and designated generally by reference numeral 100. The connector 100 can be constructed from a variety of materials, and preferably, polymer materials such as Lexan® which is a polycarbonate resin which is glass filled and available from General Electric Company. It is to be understood that other suitable polymers, including fiber filled polymers are suitable for fabricating the connector 100 in accordance with the present invention.

The connector 100 includes a head 102 and a shank 104. The head, in accordance with one embodiment, is dome shaped and has a generally circular profile thereby being constructed in the nature of a cap. It is to be understood that the head 102 can be other shapes, for example, oval, square, polygonal or the like, as well as being of uniform thickness as opposed to the dome shape disclosed. The head 102 is provided with a base surface 106 which is generally flat. The shank 104 extends transversely outward from a central portion of the base surface 106 as best shown in FIG. 1. The shank 104 is preferably constructed as an elongated cylindrical member. However, it is to be understood that the shank 104 may have other shapes, for example, square, polygon, oval and the like. The shank 104 will preferably be formed integral with the head 102 by molding the connector 100 such as by injection molding. The connector 100 may therefore be an integral or one piece unitary connector.

The shank 104 includes longitudinally extending first and second members 108, 110 which are longitudinally separated by a slot 112 therebetween as best shown in FIG. 3. The slot 112 is preferably tapered beginning at location 114 and extending to the free end of the first and second members 108, 110. The slot 112 begins at location 114 at a spaced distance from the head 102 whereby the shank 104 is provided with a solid portion generally designated by reference numeral 116. By virtue of the tapered slot 112, each of the first and second members 108, 110 have a tapered profile provided by respective inner surfaces 118, 120. Although it is preferred that the slot 112 be tapered, it is contemplated that the slot may be of uniform cross-section from location 114 to the free end of the first and second members 108, 110.

The inner surfaces 118, 120 of the first and second members 108, 110 in accordance with the preferred embodiment each define an offset in the form of at least one step or jog as best shown in FIG. 1. The step of the first member 108 is defined by the inner surface 120 having planar surfaces 122, 124 vertically offset (as viewed in FIG. 1) from one another and interconnected by a transverse wall 126. Similarly, the inner surface 120 of the second member 110 is provided with offset planar surfaces 128, 130 which are connected by a transverse wall 132. The step formed in the first and second members 108, 110 are the mirror image of each other. That is, when one step goes up, the other step goes down whereby the inner surfaces 118, 120 of the first and second members 108, 110 can abut against each other by the steps nesting within each other.

One or more cotter pin receiving openings are formed transversely through the shank 104. As best shown in FIG. 3, an opening 134 transversely extends through the second member 110 by intercepting a portion of the transverse wall 132 and the planar surface 130. In a like manner, an opening 136 extends transversely through a portion of the first member 108 by intersecting transverse wall 126 and planar surface 122. The openings 134, 136 individually form a portion of a circle or other shaped opening. The openings 134, 136 are aligned with one another to form an opening transversely through the shank 102 through which a portion of a cotter pin 138, see FIG. 1, can be inserted. A second cotter pin receiving opening can also be provided through the shank 104 by means of additional openings 134, 136 in the manner as thus far described. Any number of openings 134, 136 can be positioned longitudinally along the shank 102 between a position adjacent location 114 to a second location remote therefrom.

The tip end of the first and second members 108, 110 are provided with a lead in chamfered edge 140. A tapered flange 142 is provided circumscribing the outer surface of the first and second members 108, 110 at a location adjacent the chamfered edge 140. The tapered flange 142 has one end extending outwardly beyond the outer surface of the shank 102 forming a retaining lip 143, and another end in accordance with the preferred embodiment, having a diameter less than the diameter of the shank portion 116. As such, the tip end of the first and second members 108, 110 will have an effective diameter less than that of the shank portion 116 to provide a lead in of reduced diameter to facilitate locating the connector within an opening. The lead in is facilitated by the tapered flange 142 having a sloping outer surface 144.

Referring to FIG. 3, a connector 100 constructed in accordance with the preferred embodiment of the present invention will be described in assembling together a pair of elements 146, 148 which include an aligned opening 150 extending therethrough. By way of example, element 148 may comprise a portion of a bracket which is attached to the third rail, while the first element 146 may comprise a guard for the third rail as previously described. The tip end of the connector 100 is initially positioned within the opening 150. The reduced diameter of the tip end, as well as the chamfered edge 140 facilitate alignment of the connector within the opening. The connector 100 is forced longitudinally into the opening 150. The tapered flanges 142 engage the first element 146 surrounding the opening 150. As the connector 100 is forced inwardly, the tapered flanges 142 guide the shank 104 while compressing the first and second members 108, 110 towards each other. The radially inward movement of the first and second members 108, 110 towards each other is accommodated by the slot 112. Once the tapered flanges 142 clear the opening 150 past the second. element 148, the resilient nature of the first and second members 108, 110 cause the members to return to their original expanded position. The effective diameter of the tapered flanges 142 at the retaining lip 143 is greater than the diameter of the opening 150, thereby precluding the connector 100 from being withdrawn outwardly from its inserted position. That is, movement of the connector 100 in an outward direction will cause the retaining lip 143 of the tapered flanges 142 to engage the surface of the second element 148 surrounding the opening 150.

The offset or step provided by the inner surfaces 118, 120 of the first and second members 108, 110 provide mechanical strength to the members. In this regard, the first and second members 108, 110 should have sufficient flexibility to facilitate their compression while being forced through the opening 150. Once past the opening 150, the first and second members 108, 110 should have sufficient resiliency to expand outwardly back to their original shape and position. In addition, the first and second members 108, 110 should have sufficient rigidity and strength such that they will not collapse during their intended life in securing the first and second elements 146, 148 together. In the case of the foregoing example, vibrations caused by locomotives passing over the third rail could cause a connector to dislodge itself from the opening 150 in the event the first or second member 108, 110 should be of insufficient strength to remain expanded after insertion. The offset or step formed in the first and second members 108, 110 overcomes this potential problem by providing sufficient strength to the members, while allowing the members to maintain the required resiliency or flexibility to pass through the opening 150 yet return to their original shape and position for retaining the connector 100. As an auxiliary attachment, a cotter pin 138, see FIG. 1, can be inserted into one of the pairs of openings 136, 134. The cotter pin 138, although not required, will provide enhanced security for the connector 100 particularly in severe applications where longitudinal forces may be applied to the connector.

The connector 100 may be removed using a variety of techniques. First, if a cotter pin 138 is present, the cotter pin is removed by pulling same outwardly from within the openings 136, 134. The free end of the first and second members 108, 110 can be squeezed together using any suitable tool, such as a pair of pliers and the like. Upon squeezing the first and second members 108, 110 together, the effective diameter of the tapered flange 142 at the retaining lip 143 will be effectively less than the diameter of the opening 150. This enables the shank 104 to be slid outwardly through the opening 150. It is also contemplated that the free end of the first and second members 108, 110 can be cut off using a saw, knife or other such implement so as to remove the tapered flange 142. However, in this case the connector 100 cannot be reused.

Figure 4:
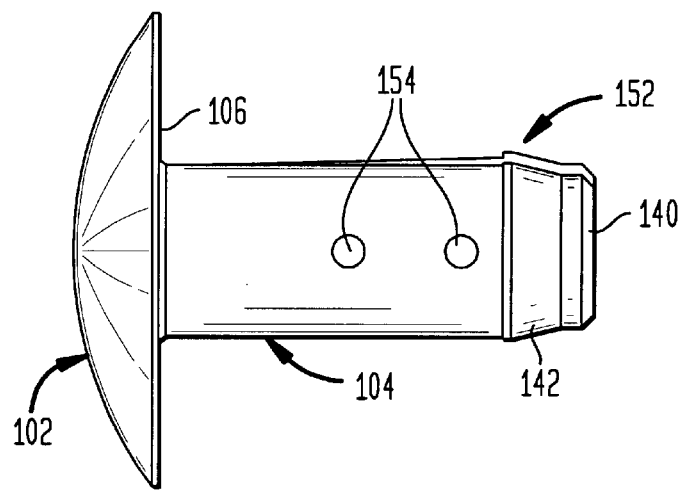
FIG. 4 is a front elevational view of a connector constructed in accordance with another embodiment of the present invention.

In accordance with another embodiment, there is shown in FIG. 4 a connector 152 wherein like numerals represent like elements with respect to the embodiment of the connector 100 as thus far described. In the connector 152, the openings 154 to receive a cotter pin 138 are provided transversely through the inner surfaces 118, 120 of the first and second members 108, 110.

Although the invention herein has been described with reference to particular embodiments, it is to be understood that these embodiments are merely illustrative of the principles and applications of the present invention. For example, the offset or step may be formed as other shapes, such as teeth, ridges, grooves and the like along the inner surfaces 118, 120 of the first and second members 108, 110. It is therefore to be understood that numerous modifications may be made to the illustrative embodiments and that other arrangements may be devised without departing from the spirit and scope of the present invention as defined by the appended claims.

What is claimed is:

1. A connector comprising a head; and a shank extending from said head including first and second longitudinally extending members having a free end, said first and second members separated by a slot having a longitudinal axis extending from said free end towards said head, said first and second members including an opening cooperating with each other to capture a cotter pin therein for removably securing said cotter pin to said shank, whereby said cotter pin is prevented from movement along the longitudinal axis of said slot.

2. The connector of claim 1, further including a tapered flange circumscribing an outer surface of each of said first and second members adjacent said free end thereof.

3. By The connector of claim 1, wherein the free end of each of said first and second members includes a chamfered edge.

4. The connector of claim 1, wherein said slot is tapered having an enlarged opening adjacent said free end of said first and second members and a smaller opening towards said head.

5. The connector of claim 1, wherein each of said first and second members are tapered towards said free end thereof.

6. The connector of claim 1, further including a tapered flange circumscribing an outer surface of each of said first and second members adjacent said free end thereof, said free end of each of said first and second members includes a chamfered edge and each of said first and second members are tapered towards said free end thereof.

7. A connector comprising a head; a shank extending from said head including first and second members having a free end, said first and second members separated by a slot extending from said free end towards said head, each of said first and second members having an offset bordering said slot.

8. The connector of claim 7, further including a cotter pin secured to said shank.

9. The connector of claim 7, further including a tapered flange circumscribing an outer surface of each of said first and second members adjacent said free end thereof.

10. The connector of claim 7, further including a tapered flange circumscribing an outer surface of each of said first and second members adjacent said free end thereof, said free end of each of said first and second members includes a chamfered edge and each of said first and second members are tapered towards said free end thereof.

11. The connector of claim 7, wherein said slot is tapered having an enlarged opening adjacent said free end of said first and second members and a smaller opening towards said head.

12. The connector of claim 7, wherein each of said first and second members are tapered towards said free end thereof.

13. The connector of claim 7, wherein each said offset comprises a single step.

14. The connector of claim 13, wherein the step of said first member is the mirror image of the step of said second member.

15. The connector of claim 13, further including an opening in said step of said first and second members, said opening in said first and second members being in alignment with each other for receiving a cotter pin for removably securing said cotter pin to said shank.

16. The connector of claim 15, wherein each said opening in said step of said first and second members is arranged transverse to a longitudinal axis of said shank.

17. The connector of claim 7, wherein said head has a diameter larger than a diameter of said shank.

18. A connector comprising a head; a shank extending from said head including first and second members having a free end, said first and second members separated by a slot extending from said free end towards said head, said first and second members having a stepped portion bordering said slot, an opening formed in said offset of said first and second members adapted to receiving a cotter pin for removably securing said cotter pin to said shank; and a tapered flange circumscribing an outer surface of each of said first and second members adjacent said free end thereof.

19. The connector of claim 18, further including a cotter pin secured to said shank.

20. The connector of claim 18, wherein each said stepped portion comprises a single step.

21. The connector of claim 20, wherein the step of said first member is the mirror image of the step of said second member.

22. The connector of claim 20, further including an opening in said step of said first and second members, said opening in said first and second members being in alignment with each other for receiving a cotter pin for removably securing said cotter pin to said shank.

23. The connector of claim 22, wherein each said opening in said step of said first and second members is arranged transverse to a longitudinal axis of said shank.

24. The connector of claim 18, wherein said head has a diameter larger than a diameter of said shank.

25. A connector comprising a head; a shank extending from said head including first and second members having a free end, said first and second members separated by a slot extending from said free end towards said head, said first and second members including an opening adapted to receive a cotter pin for removably securing said cotter pin to said shank; and a cotter pin secured to said shank.

26. The connector of claim 25, further including a tapered flange circumscribing an outer surface of each of said first and second members adjacent said free end thereof.

27. The connector of claim 25, wherein said slot is tapered having an enlarged opening adjacent said free end of said first and second members and a smaller opening towards said head.

28. The connector of claim 25, wherein each of said first and second members are tapered towards said free end thereof.

29. The connector of claim 25, further including a tapered flange circumscribing an outer surface of each of said first and second members adjacent said free end thereof, said free end of each of said first and second members includes a chamfered edge and each of said first and second members are tapered towards said free end thereof.

30. A connector comprising a head; and a shank extending from said head including first and second members having a free end, said first and second members separated by a slot extending from said free end towards said head, said first and second members including a pair of openings in spaced relationship adapted to receive a cotter pin for removably securing said cotter pin to said shank.

31. The connector of claim 30, further including a tapered flange circumscribing an outer surface of each of said first and second members adjacent said free end thereof.

32. The connector of claim 30, wherein said slot is tapered having an enlarged opening adjacent said free end of said first and second members and a smaller opening towards said head.

33. The connector of claim 30, wherein each of said first and second members are tapered towards said free end thereof.

34. The connector of claim 30, further including a tapered flange circumscribing an outer surface of each of said first and second members adjacent said free end thereof, said free end of each of said first and second members includes a chamfered edge and each of said first and second members are tapered towards said free end thereof.

35. A connector comprising a head; a shank extending from said head including first and second members having a free end, said first and second members separated by a slot having a longitudinal axis extending from said free end towards said head; and means for receiving a cotter pin for removably securing said cotter pin to said shank whereby said cotter pin is prevented from movement within said slot along the longitudinal axis thereof.

* * * * *

UNITED STATES PATENT AND TRADEMARK OFFICE
CERTIFICATE OF CORRECTION

PATENT NO. : 6,634,843 B1  Page 1 of 1
DATED : October 21, 2003
INVENTOR(S) : Alan Tarnow and Henry Shavel It is certified that error appears in the above-identified patent and that said Letters Patent is hereby corrected as shown below:

Column 5,
Line 32, after "opening" insert -- in communication with said slot and --.
Line 33, after "other" insert -- adapted --.
Line 33, delete "therein", and insert therefor -- within said opening and said slot --.
Line 36, after "slot" insert -- between said head and said free end of said first and second members --.
Line 40, delete "By".

Signed and Sealed this

Twenty-seventh Day of January, 2004

JON W. DUDAS
*Acting Director of the United States Patent and Trademark Office*